(12) United States Patent
Sivarajan

(10) Patent No.: US 10,789,318 B2
(45) Date of Patent: Sep. 29, 2020

(54) APPARATUS, SYSTEM AND METHOD FOR A BIDIRECTIONAL SEARCH ENGINE AND ITS APPLICATIONS

(71) Applicant: Ramesh Sivarajan, Shrewsbury, MA (US)

(72) Inventor: Ramesh Sivarajan, Shrewsbury, MA (US)

( * ) Notice: Subject to any disclaimer, the term of this patent is extended or adjusted under 35 U.S.C. 154(b) by 125 days.

(21) Appl. No.: 16/205,986

(22) Filed: Nov. 30, 2018

(65) Prior Publication Data

US 2020/0142934 A1    May 7, 2020

Related U.S. Application Data

(63) Continuation of application No. 14/401,190, filed as application No. PCT/US2013/039887 on May 7, 2013, now Pat. No. 10,169,464.

(60) Provisional application No. 61/646,745, filed on May 14, 2012.

(51) Int. Cl.

| | |
|---|---|
| *G06F 7/02* | (2006.01) |
| *G06F 16/00* | (2019.01) |
| *G06F 16/9535* | (2019.01) |
| *G06F 16/23* | (2019.01) |
| *G06F 16/951* | (2019.01) |
| *G06F 3/0482* | (2013.01) |
| *G06Q 10/10* | (2012.01) |
| *G06Q 30/06* | (2012.01) |

(52) U.S. Cl.
CPC ........ *G06F 16/9535* (2019.01); *G06F 3/0482* (2013.01); *G06F 16/23* (2019.01); *G06F 16/951* (2019.01); *G06Q 10/1053* (2013.01); *G06Q 30/06* (2013.01)

(58) Field of Classification Search
CPC .......... G06F 17/30867; G06F 16/9535; G06F 17/30345; G06F 16/23; G06F 17/30864; G06F 16/951; G06F 17/30; G06F 16/00; G06Q 30/08; G06Q 30/0601; G06Q 30/061; G06Q 30/06
See application file for complete search history.

(56) References Cited

U.S. PATENT DOCUMENTS

| | | | |
|---|---|---|---|
| 2008/0228544 A1* | 9/2008 | Woosley ............ | G06Q 10/1095 705/7.19 |
| 2009/0048933 A1* | 2/2009 | Cho .................... | G06Q 30/0257 705/14.55 |
| 2011/0106642 A1* | 5/2011 | Hassan ................. | G06Q 30/08 705/26.3 |

\* cited by examiner

*Primary Examiner* — Bruce M Moser
(74) *Attorney, Agent, or Firm* — Patrick Stanzione; Stanzione & Associates, PLLC

(57) ABSTRACT

A 'bi-directional search and match' system, and apparatus, or match engine, is presented along with a detailed process or algorithm for execution of the same. In this construct, a relational database, supported by appropriate software modules for other functions receives search queries from users and converts them into numerical codes that are automatically and continuously matched against the search criteria provided by other users. The match engine continues with the match process at a pre-set time interval and automatically alerts the concerned users every time a match is found or as requested by the user. A user is enabled to initiate a range of follow-up actions when at least one matching criteria is met.

26 Claims, 6 Drawing Sheets

APPARATUS, SYSTEM AND METHOD FOR A BIDIRECTIONAL SEARCH ENGINE AND ITS APPLICATIONS

REFERENCE TO RELATED APPLICATIONS

This present application is a continuation of and claims the benefit of priority to co-pending U.S. patent application Ser. No. 14/401,190, filed on Nov. 14, 2014, which claims the benefit of Provisional Patent Application No. 61/646,745, filed on May 14, 2012, the The benefit under 35 USC § 119€ of the United States parent provisional application the entire disclosures of which are hereby incorporated herein in their entirety.

FIELD OF THE INVENTION

The present inventive concept relates to the field of a search apparatus, system and method, for the computer aided searching of information in a database including remote databases accessible through the internet.

BACKGROUND OF THE INVENTION

Globally, hundreds of millions of users make several searches every hour of everyday on the internet seeking information on a vast variety of fields that include information on real estate, homes, automobiles, jobs and personal relationships. For the searches mentioned above, typically a user submits the name of the item name or place name or person or any phrase or an index number or any other information related to the said item to a database. Such information referred to as search criteria or search string in the context of this invention is presented as a query to a remote database through a user interface for example like an internet portal.

Such an internet portal can be accessed through a desk top personal computer, a network computer, a laptop computer, and a mobile internet device like a tablet personal computer or a mobile telephone.

Once a query is made or a search string is submitted to the database, the database looks for all the entries in the database that match with the search criteria and returns the results to the user through the user interface. In the context of this invention, searches conforming to this method of search are referred to as uni-directional searches.

A large number of methods and algorithms are known in the prior art for making such uni-directional searches efficiently.

Methods for automatically updating the information available in a database, based on inputs by multiple users on a real time basis is also known in the prior art.

However, the uni-directional search methods impart a serious impediment to the user. For example, a user seeking for a job opportunity typically accesses a job-search website and submits certain keywords or search strings related to the job sought and gets the results that are available with the database at that particular point of time. This is true for the search on an automobile or a home or a personal relationship.

When the database is updated at a later time with new information by some other user or the database administrator, in the prior art methods, the updated information is not readily and automatically available to the original searcher except through accessing the database at frequent intervals and checking for any new updates.

Limited 'alert' services are known in the prior art when a user is alerted by an email or a text message when a matching criterion is that he or she placed in a database is met.

However, such alert services are vastly in-effective because they are limited to one particular database owner thus forcing the information seeker to register with multiple information providers. The examples of such alert services are users getting an email with the links from a particular newspaper, journal or a website.

The limitation of the prior-art methods arises from the uni-directional nature of the search treating information seeker as the 'seeker' and the database as the single information provider, notwithstanding the fact that the database can be updated on a real time basis by multiple users.

The method described in this invention disclosure, named as 'Multi-directional Match Engine' eliminates this shortcoming by making all the users as 'information seekers' and dynamically matches the criteria of one particular information seeker with information provided by other users making the match on a pre-set criteria selected by the individual users.

Even though, the method in the above paragraph is named as 'Multi Directional Match Engine' a vast majority of the search processes involve a two way match for most of the searches. The algorithm described here in terms of examples and figures is considered a 'bi-directional match' as an example and the term is used as a sub-set of a multi-directional match. Those familiar with the art can very easily relate or extend one to the other.

SUMMARY OF THE INVENTION

The current invention describes a bi-directional match engine, essentially a system consisting of a new method and algorithm for a software that can be run on a computer managing a dynamic database.

The current invention is based on a simple but hitherto overlooked fact that most of the information searches involve an information searcher or seeker and an information provider who also seeks someone matching his/her criteria. For example, a job seeker always looks for a job provider or someone seeking a job candidate on the other end. Similarly, an automobile or a home seller searches for a buyer at the other end who is searching for a seller meeting certain criteria. Such situation applies also in the case of personal relationships.

Few prior art databases provide a limited match function when search criteria is defined and provided as a numerical string or a unique code, directly entered code by the user within a single database. For example, a web based stock trading website accepts buy or sell instructions left by a user in terms of a stock symbol, number of stocks and the price range to buy or sell. But that search is complete and the process terminated once the first match is met.

The core of this invention is a dynamic and universal bi-directional match engine (BDME) that accepts information from users in many forms including a simple touch function on a touch screen, converts all the user inputs into matchable strings, matches them on a continuous basis at frequent time intervals, alerts the users every time a match is made and take instructions from users on follow-up actions on the searches made. Such a system is referred to here variously as BDME, bidirectional match engine, multidirectional match engine or simply a match engine.

In the method described in this invention all the users can be treated as information seekers or as information providers at the same time even though this invention disclosure for the sake clarity or for example, describes at some places or figures, one set of user(s) as information seeker(s) and the other set of user(s) as information provider(s). Regardless, the algorithm for the match process is unaffected and can be easily taken care at the coding stage.

In one embodiment of this invention a searcher or seeker provides his/her search criteria through an user interface in a desktop computer or laptop computer or a network computer or a mobile internet device using the selection of a set of criteria from a drop down menu or a touch button. This search criteria and the user's information is converted into a bundle of searchable, numerical strings or alphanumeric strings or codes by the computer program and stored in a portion of the database.

Information provided by another user through an user interface in a desktop computer or laptop computer or a network computer or a mobile internet device using the selection of a set of criteria from a drop down menu or a touch button. This search criteria and the user's information is converted into a bundle of searchable, numerical strings or alphanumeric strings or codes by the computer program and stored in a portion of the database The number of users as defined in the two paragraphs directly above form the user base and in terms of size that user base can consist of tens of users, hundreds, thousands, hundred thousands, millions, hundreds of millions or more number of users. The structure of the data base and the computer hardware system and the communication system to support such user base is scalable and depends on the size of the user base.

The matching core of the database matches the strings or the bundle of strings against the strings provided by other users who have provide their search criteria through the same or a closely resembling set of strings and determines whether a match is made or not at each attempt.

Once a 'match' is found by the match engine, all the users whose strings are involved in the match are alerted with a text message placed by the user and the method of alert (example email or text message) selected by the individual users. More details are provided in the detailed description of the invention and examples.

DETAILED DESCRIPTION OF THE INVENTION

The invention described is based on principle that most personal information searches on the internet involve a search of bi-directional nature. The classical search, for example a library user looking for certain information from a hand book or encyclopedia needs to locate the said hand book and look for the information that remains as passive information in the hand book. A user looking for a car, job or a personal relationship of his preference in the classifieds section of a newspaper also faces a similar situation. He or she has to look at every classified advertisement for the criteria listed until an advertisement with the matching criteria is met. If the desired criteria is not found the search continues with the next day's or week's newspaper. This is a very time consuming and laborious process.

The advent of computer and relational databases and the internet has made the above process easier. However, the nature of the search is surprisingly similar with same level of inefficiency is finding the right match.

The current invention eliminates the inefficiency in such a computer aided search process by exploiting the bi-directional nature involved in most searches. For example, a user searching for buying a car searches the internet with pre-set criteria like the make, model year, mileage range, price range among other preferences. There will be multiple users trying to sell their cars with key characteristics like make, model, color, mileage and price range.

Due to the dynamic nature of the internet based search, in the above example, if multiple users are seeking to buy an automobile based on a pre-set criteria, another set of multiple users will exist at the same time trying to sell automobiles meeting that criteria. This is true for any type of transaction that involves a seeker and provider.

Even though both the buyer and seller are referred to as users in the context of this invention and can be used interchangeably, in general, a user contributing a range of criteria is referred to as seeker and a user contributing a concrete set of criteria to the database is referred to as provider. For example, a user seeking to buy a car can search for a car with a range of criteria that defines the make, color and price range among others. On the other hand a user trying to sell an automobile will be able to provide only a concrete set of criteria on certain items like its make, vintage, color, mileage, etc.

Figure 1:
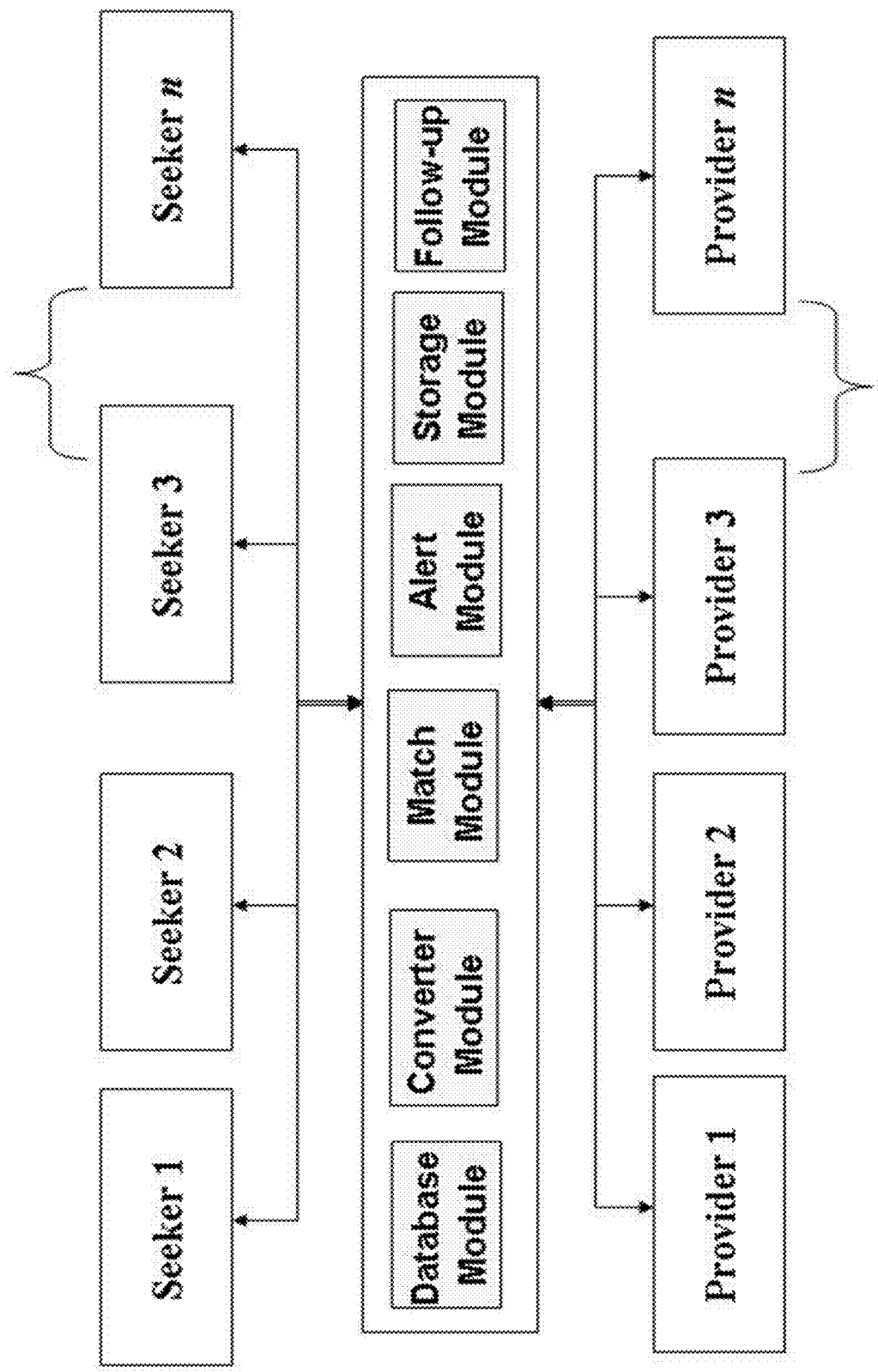
FIG. 1 is a schematic drawing showing the construct of the bidirectional search engine or the match engine. The diagram showing multiple users interact with the match engine core. The match engine consists of various modules or components only some of which are shown. The components interact with each other and the user base.

FIG. 1 shows the general construct of the match engine, where multiple users will interact with the match engine as seekers or providers.

The multi-directional search engine, or the bi-directional search engine or the match engine as is variously referred to in this invention is a software program or a software system or a collection of computer programs functioning in synchronization with each other.

One of the modules of the match engine is a database module that receives search criteria as input from multiple users defined as the user base on a continuous and dynamic basis in real time, and stores the input in marked areas of the database.

One of the modules of the match engine is a converter module or computer program that converts the user information into numeric or alphanumeric strings or codes referred to as search strings.

One of the modules of the match engine is a matching module or a match core which is a computer program that matches the search strings of one user or set of users against the search strings provided by other user or set of users on a continuous basis at a pre-set time interval.

One of the modules of the match engine is an alerting module or computer program that triggers an alert message for the matching users every time a match is found by the matching program and continues with the match process defined in the immediately preceding paragraph.

One of the modules of the match engine is a terminate module or computer program that stops the matching process once a pre-set criteria is met or on a specific user input or administrative input to stop.

One of the modules of the match engine is a storage module or computer program to handle files stored by each individual user where specific user files and accessed by the follow-up module.

One of the modules of the match engine is a 'follow-up' module or computer program that receives and specific commands from a user or a group of users or the administrator and initiates a specific follow-up action on one or more files stored in the storage module.

One of the modules of the match engine is a verifier module or computer program that functions in synchronization with the match engine and which sends an automatic verification message to an user or group of users through an email or text message and receives authentication from the user or group of users confirm the legitimacy of a user's requests and information submitted to the match engine.

One of the modules of the match engine is a checking module or a computer program that functions in synchronization with the match engine and which sends a periodic and automatic check message to an user or group of users through an email or text message and receives a response from the user or group of users based on which confirms the ? of an input data submitted by the user.

One of the modules of the match engine is an 'usage control' module or computer program that functions in synchronization with the match engine, the verifier module and the checking module and which sends a command to the match engine and modify the privileges of a user by enhancing or suspending or removing a part or all of the input data submitted by the user.

One of the modules of the match engine is an intervene module or a computer program that allows an authorized administrator of the match engine to manually intervene and alter one or more functions of the match engine, the verifier module, the checking module and the usage control module.

One or more of the modules described above can be combined in any manner desired to construct the match engine.

Figure 2:
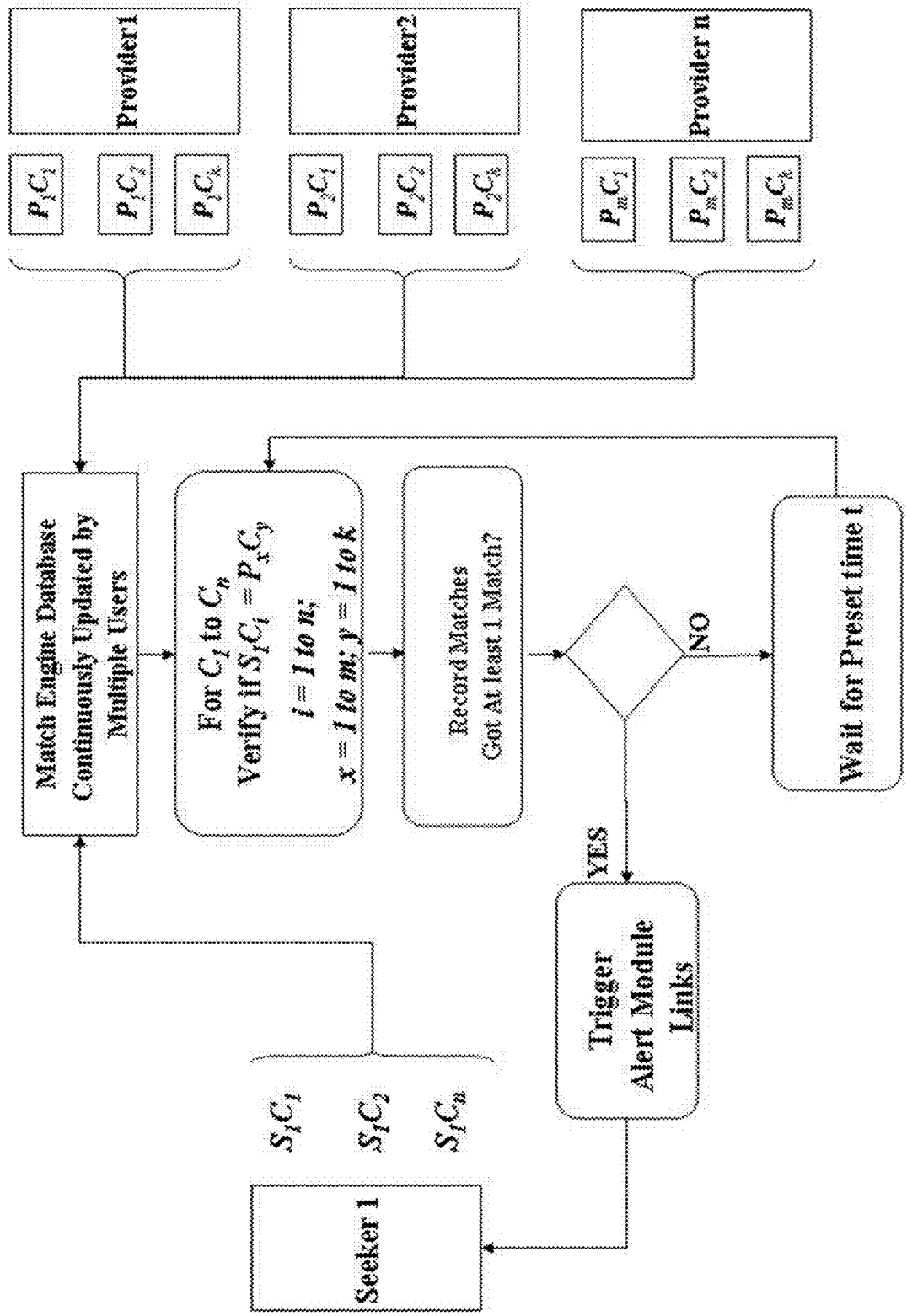
FIG. 2 shows the schematics of the functional core or match core of the bidirectional engine or the match engine. The example shown here is for a case involving single information seeker and multiple information providers.

FIG. 2 shows the functional core of the match engine and the algorithm how the match engine works. For clarity, the case shown here is for a single seeker looking for information that can be contributed by multiple providers. In this case, Seeker1 places a set of the criteria $(S_1C_1, S_2C_2, \ldots S_nC_n)$ with the database. At a given time set of providers $P_1$, $P_2$, $P_3$ to $P_m$ have also placed a set of provider's criteria $(P_1C_1, P_1C_2, \ldots P_1C_n)$ to $(P_mC_1, P_mC_2, \ldots P_mC_k)$ with the database of the match engine.

In one of the major embodiments at the core of the match engine, the criteria above as contributed by the users are converted as searchable numerical strings or markers or codes by the converter module, assigned with appropriate label to identify the user as seeker or provider. For the purpose of this disclosure such searchable strings may also be referred to generally as search strings, strings or 'markers'.

The match engine, at a given time interval preset by the administrator matches for any correspondence between the seeker's markers and the providers markers. Condition at which a match is met is represented at in FIG. 2 as $S_1C_1 = P_xC_y$.

When a match is met the condition to give an alert to the seeker and activate the link for the matching provider or providers is triggered by the alert module. This matching process eliminates the need for the seeker to manually look at the links of other providers who do not have a matching one.

In one of the embodiments, all the seekers and providers leave an 'access document' stored in a separate portion or storage module of the match engine and access is allowed based on permission rules operated by the match engine.

The 'access document' can be additional verbal details, a resume, or personal website or social media page an audio file or a video file or a combination of the above.

When no matches are found as described above the match module of the engine waits for a pre-set time t and continues with the match process if any new provider has contributed a matching criteria.

In one of the embodiments the alert can be sent by the match engine as an email or a text message to the users to an address or a mobile phone number provided by the users while registering with the database.

In one of the embodiments, the alerted users can be sent further links or downloadable applications to act further on the match.

In yet another embodiment, the checking module of the match engine may send periodic requests to the users referred to here as 'checkers' to verify their continued interest and availability of the criteria and suspend the inclusion of the criteria in the match process if an affirmation is not received. The suspension of a set of criteria is revoked only if a confirmation is received on a subsequent checker.

In yet another embodiment, the checking module may permanently remove the criteria provided by a user from inclusion in the match process if no response is received once a pre-set number of checkers are sent to the user.

Figure 3:
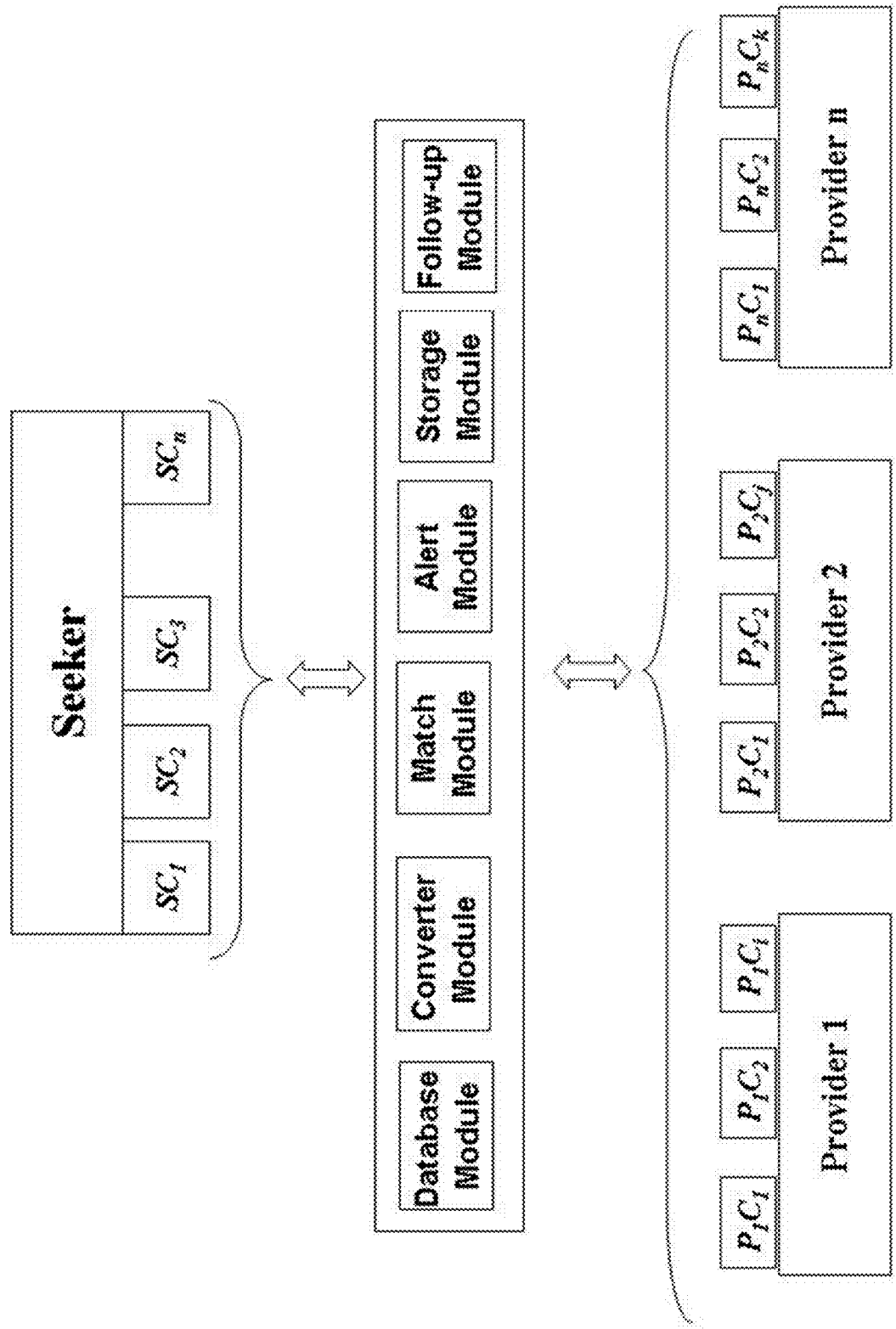
FIG. 3 shows schematics of the data flow for a case involving single information seeker and multiple information providers.

FIG. 3 shows the case for the data flow process for collecting the criteria into the database where a single seeker places criteria $S_1C_1$ to $S_1C_n$ to be matched against the criteria placed by multiple providers $P_1, P_2, \ldots P_n$. Examples of such a process will be a seeker placing requirements for an automobile with a range of requirements and multiple individual sellers or dealers will provide a set of criteria for a large number of automobiles.

Figure 4:
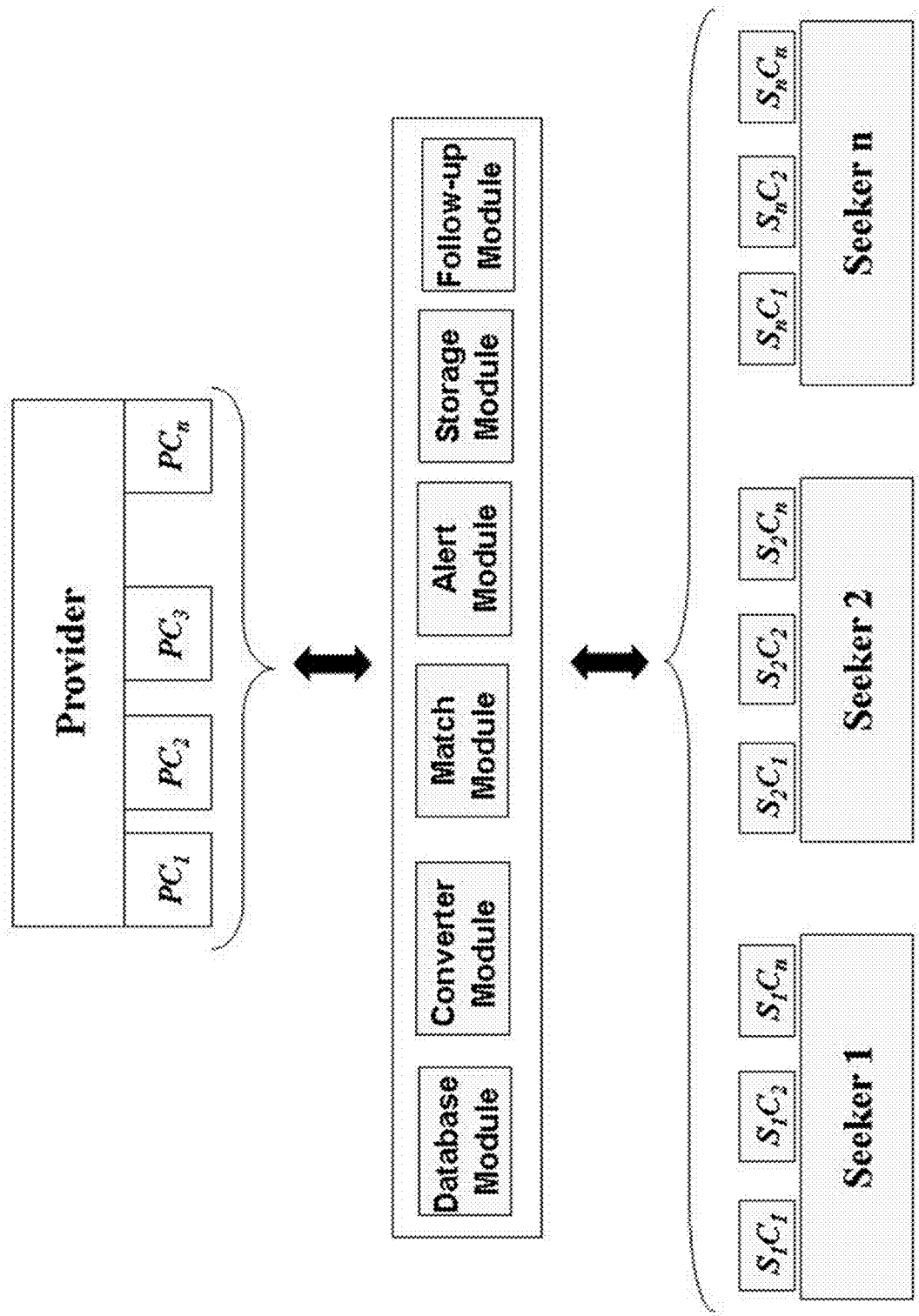
FIG. 4 shows schematics of the data flow for a case involving multiple information seekers and a single information provider.

FIG. 4 shows the case for the data flow process for collecting the criteria into the database where a single provider places criteria $P_1C_1$ to $P_1C_m$ to be matched against the criteria placed by multiple seeker $S_1, S_2, \ldots S_n$. Examples of such a process will be an employer placing the requirements for a single job or the specifications of a home that will be matched against the criteria placed by multiple seekers looking for a job or a home.

Figure 5:
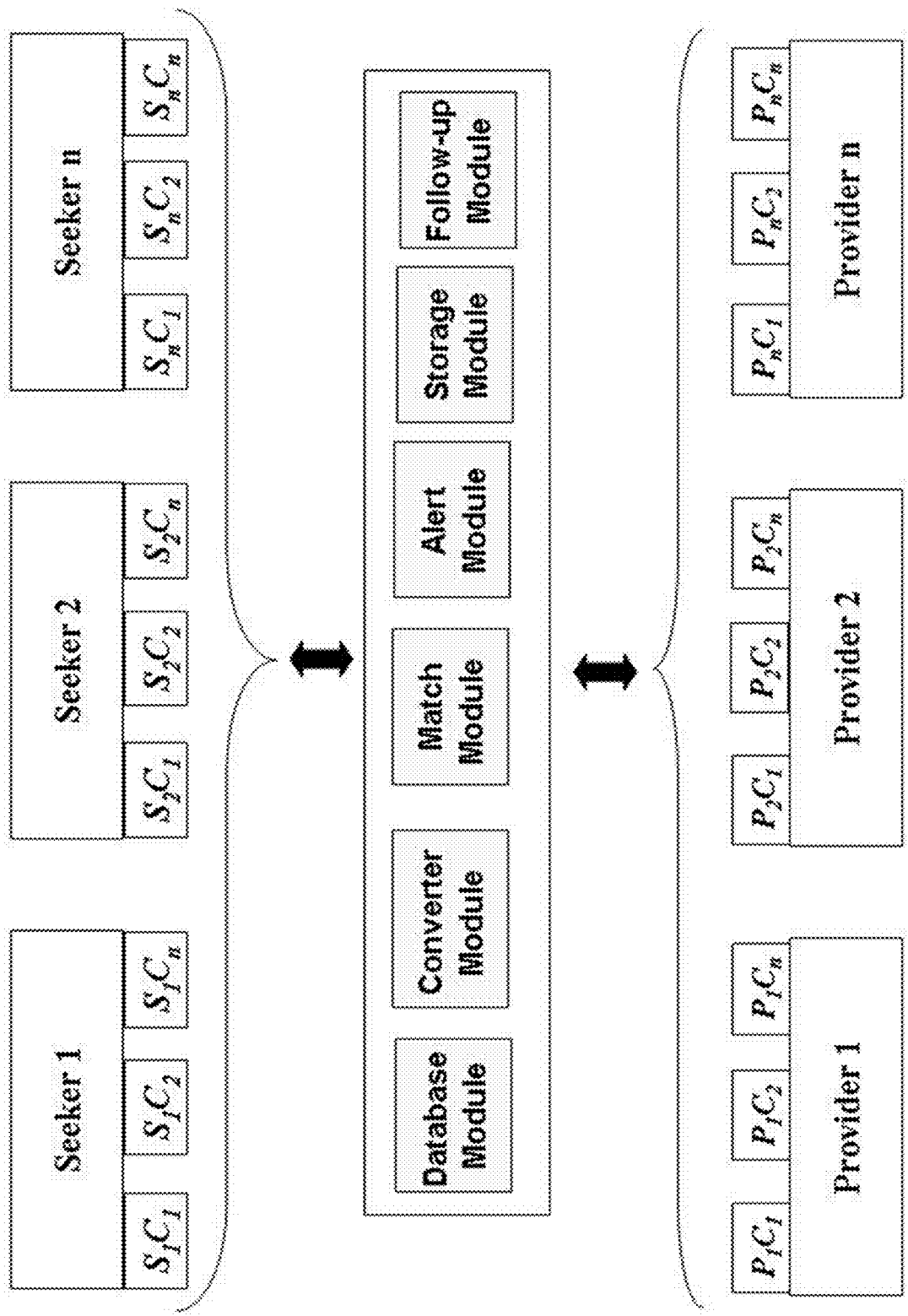
FIG. 5 shows schematics of the data flow for a case involving multiple information seekers and multiple information provider.

FIG. 5 shows the case for the data flow process for collecting the criteria into the database where a multiple providers $P_1, P_2, \ldots P_n$ place criteria to be matched against the criteria placed by multiple seekers $S_1, S_2, \ldots S_n$.

Examples of such a process will be users looking for personal relationships based on some of their personal preferences.

Regardless of the above, the basic process in the functional core of the match engine remains very similar to the process described in FIGS. 1 and 2 and can be appropriately modified to suit different situations by those familiar in the art.

In one of the embodiments, the input from the user can be through a personal computer connected to the internet by a wired or wireless network, a laptop or palmtop computer connected to the internet by a wired or wireless network, a mobile device connected to the internet by a wired or wireless network, or any such device that can be connected to the database of the match engine.

The input process for placing the criteria into the database by the users can be touch screen device where appropriate icons are touched or a drop-down menu selected by clicking a computer mouse or by manual entry of the criteria in a table or emailing of the criteria in a certain format or a combination of one or more of the above.

In one of the embodiments utilizing a touch screen device, touching an appropriate icon adds the criteria into the database and at the same time leads to the next screen where further selection criteria are presented.

Figure 6:
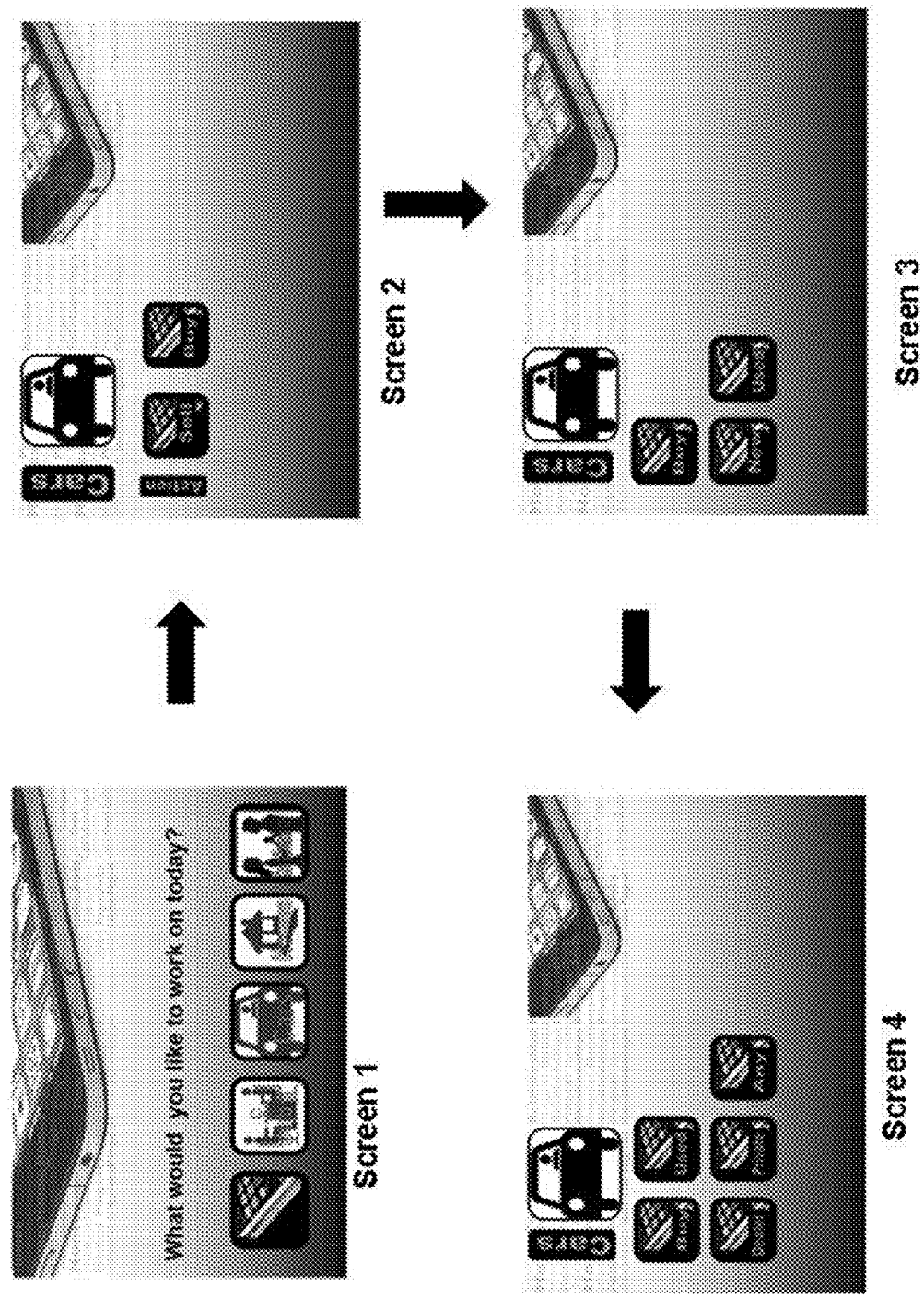
FIG. 6 shows examples of screen shots of the user interface where a user, in this case seeking to buy an automobile will go through multiple touch buttons to build his or her criteria string.

FIG. 6 shows a non-exhaustive example of screen shots for such a process described above where a user seeks to buy an automobile. In the first screen (screen 1) the user selects the icon for CARS by touch or by a mouse click. The database updates this input and leads to screen 2. Here the user is asked to select an action between 'buy' and 'sell'. When the user in the example selects 'buy' the database updated again leading to screen 4. Here the user will have options to select the preference to buy from a private seller or a dealer or anyone.

As described above the user can provide all the information that the user would prefer to state in his buy. Since the preferences are 'criteria' based rather than a verbal description assigning a numerical code for each selection and stringing them together at the end will be possible for the match engine to match against the strings constructed based on input by other users.

In one of the embodiments, a user with enormous dataset can enter data into the database, for example an automobile dealer with thousands of automobiles to describe can directly input data into a table designed to reflect the selection criteria available to the buyer and in a format recognizable by the match-engine database for direct reading. Such tables can be provided to users with preferred access to the match engine.

In one of the embodiments users can select the degree of match, expressed as a percentage or number of matching criteria to receive an alert.

In yet another embodiment the verifier module of the match engine can send the user verifying messages referred to as 'verifiers' to ensure they are the authorized users of the email or the telephone number they register to receive the alerts from the match engine. The match engine may include their input into the database only on verification by this process.

In yet another embodiment, the users may be assessed a user fee to access the services of the match engine, including a 'per event fee' for every matching alert sent to the user.

In yet another embodiment, a user in the user base can receive for free or buy a certain number of 'alerts' referred to as 'pings' from the administrator of the match engine or a licensed service provider like a mobile phone network.

What is claimed is:

1. A method of computer aided searching by a plurality of seeker users of information stored in a database by a plurality of provider users, the method comprising the steps of:
   (a) wirelessly receiving, at a computing device configured to conduct bi-directional searches, a plurality of search criteria as input by the plurality of provider users at respective first external devices and storing the received search criteria in a first section of a database of the computing device in the form of a plurality of alphanumerical strings selected from a pre-assigned set of alphanumerical strings, each alphanumerical string in the set of alphanumerical strings having been pre-assigned to a search criterion;
   (b) wirelessly receiving at the computing device a plurality of search criteria as input by the plurality of seeker users at respective second external devices and storing the received search criteria in a second section of the database in the form of a plurality of alphanumerical strings selected from the pre-assigned set of alphanumerical strings;
   (c) the computing device, at a determined time interval, comparing the plurality of alphanumerical strings representing the search criteria originally received from the plurality of provider users and stored in the first section of the database against the plurality of alphanumerical strings representing the search criteria originally received from the plurality of seeker users and stored in the second section of the database;
   (d) the computing device determining that a match has been found if at least one alphanumerical string from the first section of the database matches at least one alphanumerical string from the second section of the database;
   (e) providing matching results to the user within the plurality of seeker users or the plurality of provider users from which the search criteria were originally received when the computing device has determined that a match has been found;
   (f) transmitting at least one of a request for a confirmation response of a continued interest in the input criteria to the plurality of seeker users and a request for a confirmation response of a continued availability in the input criteria to the plurality of provider users after a predetermined period of time $t_1$ from the respective inputs;
   (g) modifying the input criteria of at least one of the plurality of seeker users or the plurality of provider users based on a received response to the transmitted request; and
   (h) waiting for a pre-set time $t_2$ and then continuing with the matching process of step (c) when any new provider user or new seeker user contributes new search criteria.

2. The method of claim 1, wherein the modifying of the input search criteria is a suspension of the input criteria from being searched.

3. The method of claim 1, wherein the modifying of the input search criteria is a removal of the input search criteria from the respective section of the database.

4. The method of claim 1, wherein the search criteria received by the computing device is received in the form of a plurality of alphanumerical strings pre-converted at the first and second external devices.

5. The method of claim 4, wherein search criteria are converted into the form of a plurality of alphanumerical strings selected from a pre-assigned set of alphanumerical strings by a program developed in the respective first and second external devices.

6. The method of claim 5, wherein the program developed in the first and second external devices recognizes and converts the input search criteria at a touch screen interface thereof into the sets of alphanumerical strings.

7. The method of claim 1, wherein search criteria received by the computing device represents characteristics of an automobile.

8. The method of claim 1, wherein search criteria received by the computing device represents characteristics of work related openings or work seeking candidates.

9. The method of claim 1, wherein search criteria received by the computing device represents characteristics of real estate property.

10. The method of claim 1, wherein search criteria received by the computing device represents characteristics of a personal relationship.

11. The method of claim 1, further comprising receiving, in response to providing matching results to a seeker user among the plurality of seeker users in which search criteria was received, a command from the seeker user to release pre-stored information in a storage module of the computing device to only select providers among the matching provider users.

12. The method of claim 1, further comprising receiving, in response to providing matching results to a seeker user among the plurality of seeker users in which search criteria was received, a command from the seeker user to release an internet link pre-stored in a storage module of the computing device to only select provider users among the matching provider users.

13. A bi-directional search system to search criteria provided by a plurality of seeker users and to search criteria provided by a plurality of provider users, the bi-directional search system comprising:
   a computer including:
      a transceiver configured to wirelessly receive a plurality of search criteria from a plurality of provider users and to wirelessly receive a plurality of search criteria from a plurality of seeker users;
      a database configured to store the search criteria received from the plurality of provider users in a first section thereof and to store the search criteria received from the plurality of seeker users in a second section thereof, the search criteria being stored in a form of a corresponding plurality of alphanumerical strings selected from a pre-assigned set of alphanumerical strings, each alphanumerical string in the set of alphanumerical strings having been pre-assigned to a search criterion;
      at least one processor configured to:
         at a determined time interval, compare alphanumerical strings representing the search criteria originally received from at least one provider user and stored in the first section of the database against the alphanumerical strings representing the search criteria originally received from the at least one seeker user and stored in the second section of the database,
         determine that a match has been found when at least one alphanumerical string from the first section of the database matches at least one alphanumerical string from the second section of the database, and transmit, through the transceiver, matching results to at least one user within the at least one seeker user or the at least one provider user from which the search criteria was originally received when the processor determines that a match has been found, otherwise wait for a pre-set time $t_1$ and then continue the process of comparing alphanumerical strings when any new provider search criteria or new seeker search criteria is received;
   at least one first external device to wirelessly transmit search criteria input thereto from a corresponding at least one provider user; and
   at least one second external device to wirelessly transmit search criteria input thereto from a corresponding at least one seeker user.

14. The system of claim 13, wherein the at least one processor is further configured to:
   transmit at least one of a request for a confirmation response of a continued interest in the received search criteria to the at least one seeker user and a continued availability in the received search criteria to the at least one provider user after a predetermined period of time $t_2$ after wirelessly receiving the respective search criteria; and
   modify the search criteria received from the at least one seeker user or the search criteria received from the at least one provider user based on the confirmation response received.

15. The system of claim 14, wherein the modifying of the search criteria received from the at least one seeker user or the search criteria received from the at least one provider user includes one of suspending or removing at least a part of the search criteria received.

16. The system of claim 14, wherein the at least one first external device and the at least one second external device comprises mobile communication device with a key input interface or a touch screen interface to receive search criteria from the corresponding user.

17. The system of claim 13, wherein the search criteria input to the at least one first and second external devices is selected from at least one of a drop-down menu via a keypad and a drop down menu of a touch screen.

18. The system of claim 13, wherein the at least one first external device and the at least one second external device wirelessly communicate data with the transceiver via either a local wireless network wirelessly through the Internet.

19. The system according to claim 13, wherein the computer is one of a desk top computer, a network computer, a laptop computer, a mobile computing device or a tablet device with an interface to receive a search criteria input by the user.

20. The system according to claim 13, wherein in response to the transmission of matching results to a seeker user from which search criteria was originally received, the at least one second external device transmits a command to the computer to release pre-stored information in a storage module of the computer to only select providers among the matching provider users.

21. The system according to claim 13, wherein in response to the transmission of matching results to a seeker user from which search criteria was originally received, the at least one second external device transmits a command to the computer to release an internet link pre-stored in a storage module of the computer to only select providers among the matching provider users.

22. A computing apparatus configured to perform a bi-directional search of search criteria provided by a plurality of seeker users and search criteria provided by a plurality of provider users, the computing apparatus comprising:

interface configured to receive a plurality of search criteria from a plurality of provider users, to receive a plurality of search criteria from a plurality of seeker users, and to receive specific input commands from the provider users and seeker users in response to matching results output by the computing apparatus;

a database configured to store the search criteria received from the plurality of provider users in a first section thereof and to store the search criteria received from the plurality of seeker users in a second section thereof, the search criteria being stored in a form of a corresponding plurality of alphanumerical strings selected from a pre-assigned set of alphanumerical strings, each alphanumerical string in the set of alphanumerical strings having been pre-assigned to a search criterion; and at least one processor configured to:
- at a determined time interval, compare alphanumerical strings representing the search criteria originally received from at least one provider user stored in the first section of the database against the alphanumerical strings representing the search criteria originally received from the at least one seeker user stored in the second section of the database,
- determine that a match has been found when at least one alphanumerical string from the first section of the database matches at least one alphanumerical string from the second section of the database, and
- output matching results to at least one user within the at least one seeker user or the at least one provider user from which the search criteria was originally received when the processor determines that a match has been found, otherwise wait for a pre-set time $t_1$ and then continue with the comparing alphanumerical strings when any new provider search criteria or new seeker search criteria is received.

23. The computing apparatus according to claim 22, wherein the interface comprises a transceiver configured to wirelessly receive the plurality of search criteria and commands from the plurality of provider users and to wirelessly receive a plurality of search criteria and commands from the plurality of seeker users, and to transmit the output matching results to the at least one user within the at least one seeker user or to the at least one provider user from which the search criteria was originally received when the processor determines that a match has been found.

24. The computing apparatus of claim 22, wherein the computing apparatus is one of a desk top computer, a network computer, a laptop computer, a mobile computing device or a tablet device.

25. The computing apparatus according to claim 22, further comprising:
receiving, in response to outputting matching results to a seeker user among the plurality of seeker users in which search criteria was received, a command from the seeker user to release pre-stored information in a storage module of the computing apparatus to only select providers among the matching provider users.

26. The computing apparatus according to claim 22, further comprising:
receiving, in response to outputting matching results to a seeker user among the plurality of seeker users in which search criteria was received, a command from the seeker user to release an internet link pre-stored in a storage module of the computing apparatus to only select provider users among the matching provider users.

* * * * *